S. N. BRAYSHAW.
FURNACE FOR HEATING STEEL CUTTERS AND OTHER TOOLS OR ARTICLES.
APPLICATION FILED DEC. 17, 1909.

977,778.

Patented Dec. 6, 1910.
6 SHEETS—SHEET 2.

Witnesses
R. Goodstein
E. Schallinger

Inventor
Shipley Neave Brayshaw
by B. Singer
Atty

S. N. BRAYSHAW.
FURNACE FOR HEATING STEEL CUTTERS AND OTHER TOOLS OR ARTICLES.
APPLICATION FILED DEC. 17, 1909.

977,778.

Patented Dec. 6, 1910.

6 SHEETS—SHEET 3.

WITNESSES.
R. Goodstein
E. Schallinger

INVENTOR
Shipley Neave Brayshaw
by B. Singer
Att'y

S. N. BRAYSHAW.
FURNACE FOR HEATING STEEL CUTTERS AND OTHER TOOLS OR ARTICLES.
APPLICATION FILED DEC. 17, 1909.
977,778.
Patented Dec. 6, 1910
6 SHEETS—SHEET 4.
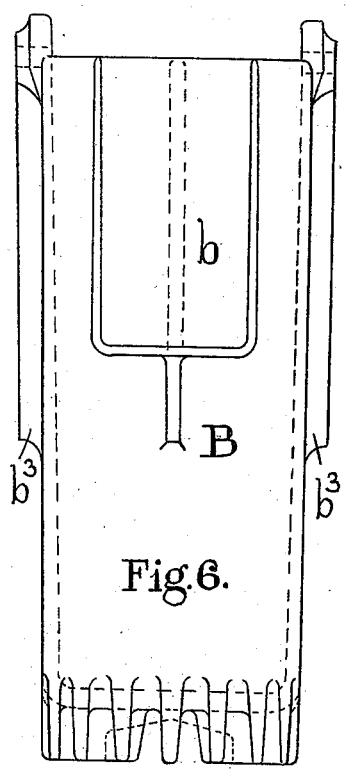
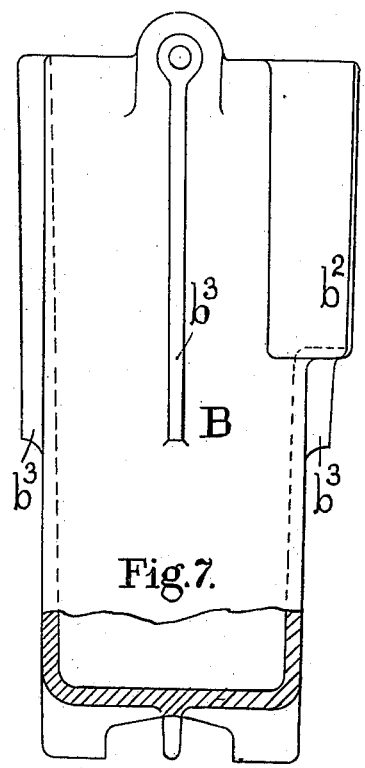
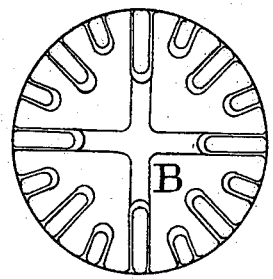
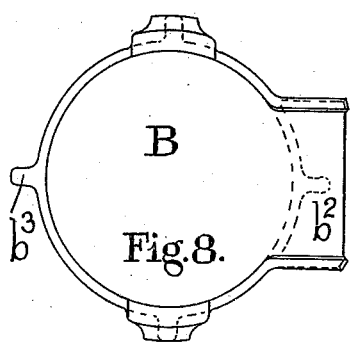
WITNESSES.
R. Goodstein
E. Schallinger
INVENTOR
Shipley Neave Brayshaw
by B. Singer
Att'y
THE NORRIS PETERS CO., WASHINGTON, D. C.

S. N. BRAYSHAW.
FURNACE FOR HEATING STEEL CUTTERS AND OTHER TOOLS OR ARTICLES.
APPLICATION FILED DEC. 17, 1909.

977,778.

Patented Dec. 6, 1910.

6 SHEETS—SHEET 5.

WITNESSES.

INVENTOR

Shipley Neave Brayshaw

S. N. BRAYSHAW.
FURNACE FOR HEATING STEEL CUTTERS AND OTHER TOOLS OR ARTICLES.
APPLICATION FILED DEC. 17, 1909.

977,778.

Patented Dec. 6, 1910.
6 SHEETS—SHEET 6.

WITNESSES.

INVENTOR.

Shipley Neave Brayshaw

UNITED STATES PATENT OFFICE.

SHIPLEY NEAVE BRAYSHAW, OF HULME, MANCHESTER, ENGLAND, ASSIGNOR TO GEORGE NASH, OF NEW YORK, N. Y.

FURNACE FOR HEATING STEEL CUTTERS AND OTHER TOOLS OR ARTICLES.

977,778. Specification of Letters Patent. Patented Dec. 6, 1910.

Application filed December 17, 1909. Serial No. 533,591.

*To all whom it may concern:*

Be it known that I, SHIPLEY NEAVE BRAYSHAW, a British subject, residing at Hulme, Manchester, county of Lancaster, England, have invented certain new and useful Improvements in Furnaces for Heating Steel Cutters and other Tools or Articles, of which the following is a specification.

This invention relates to improvements in salt bath furnaces for heating cutters or other tools or articles of steel, of the type in which a melt pot, to contain the fusible salt and receive the articles, is wholly inclosed by a casing and heated by burners at the bottom of the furnace.

This invention is designed to improve the construction and arrangement of the furnace, and to avoid defects, more especially to prevent splashing or overflow of the molten salt over or around the outside of the pot and into contact with the heated flames or gases, and to give access of flame to the pot at all points so that the pot may be heated from the bottom, the sides and the top, and also to inclose the lower part of the furnace to prevent loss of heat.

The invention will be fully described with reference to the accompanying drawings forming part of the specification.

Figure 1:
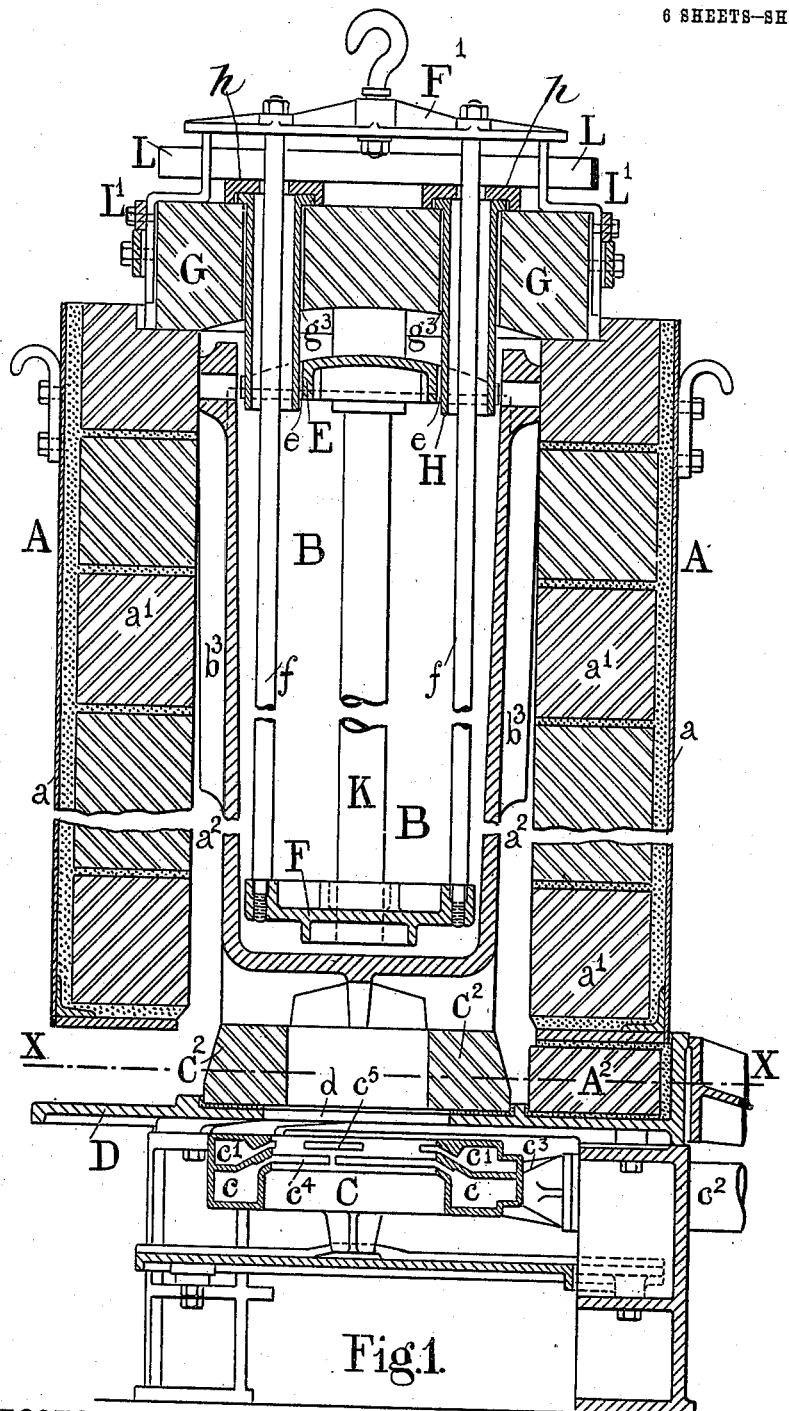
Figure 2:
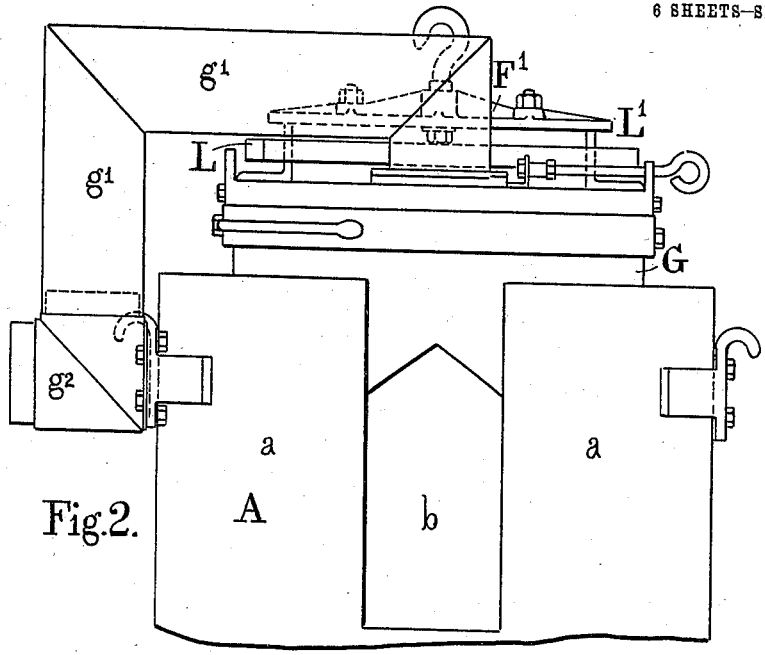
Figure 3:
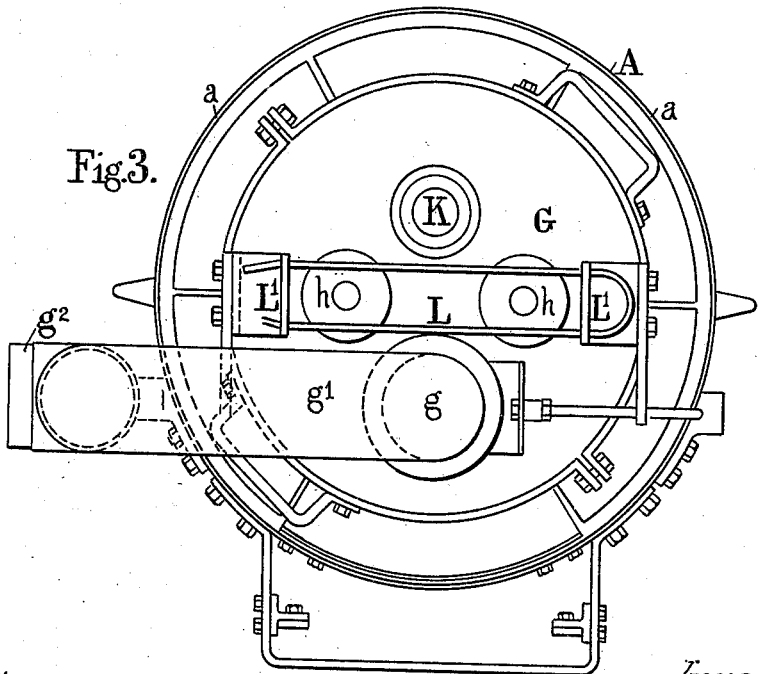
Figure 4:
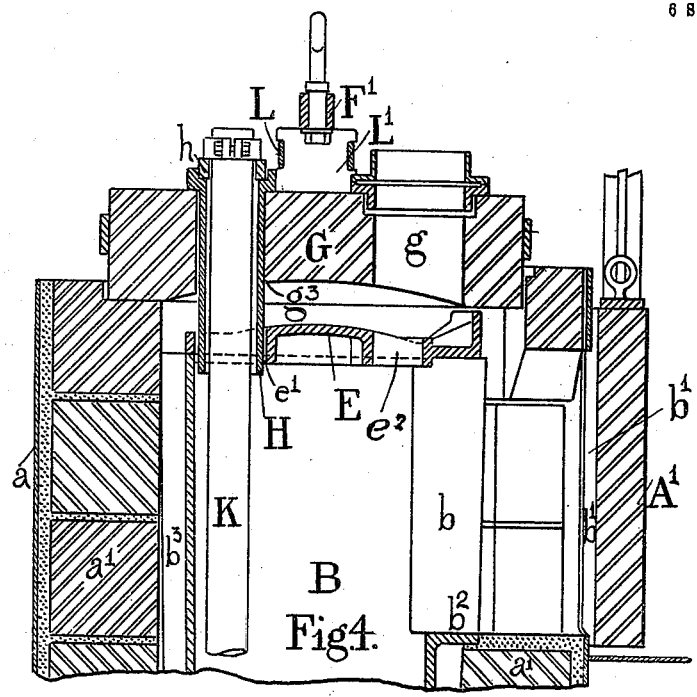
Figure 5:
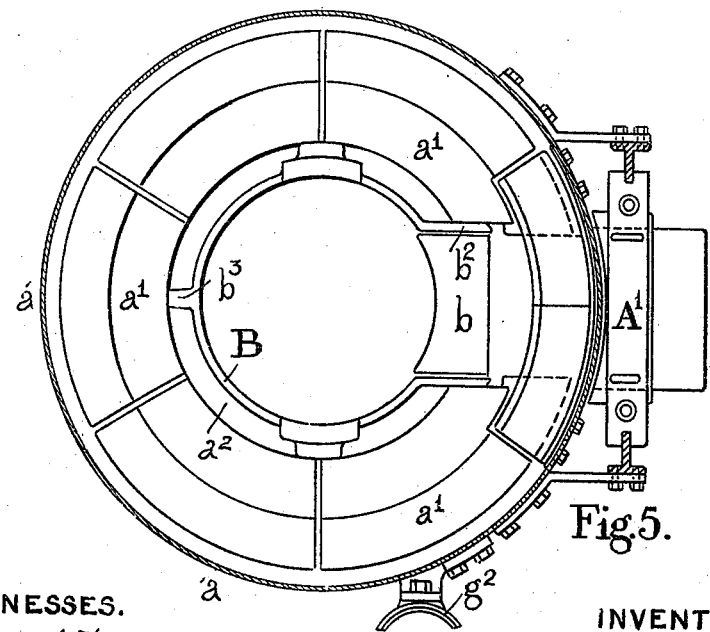
Figure 14:
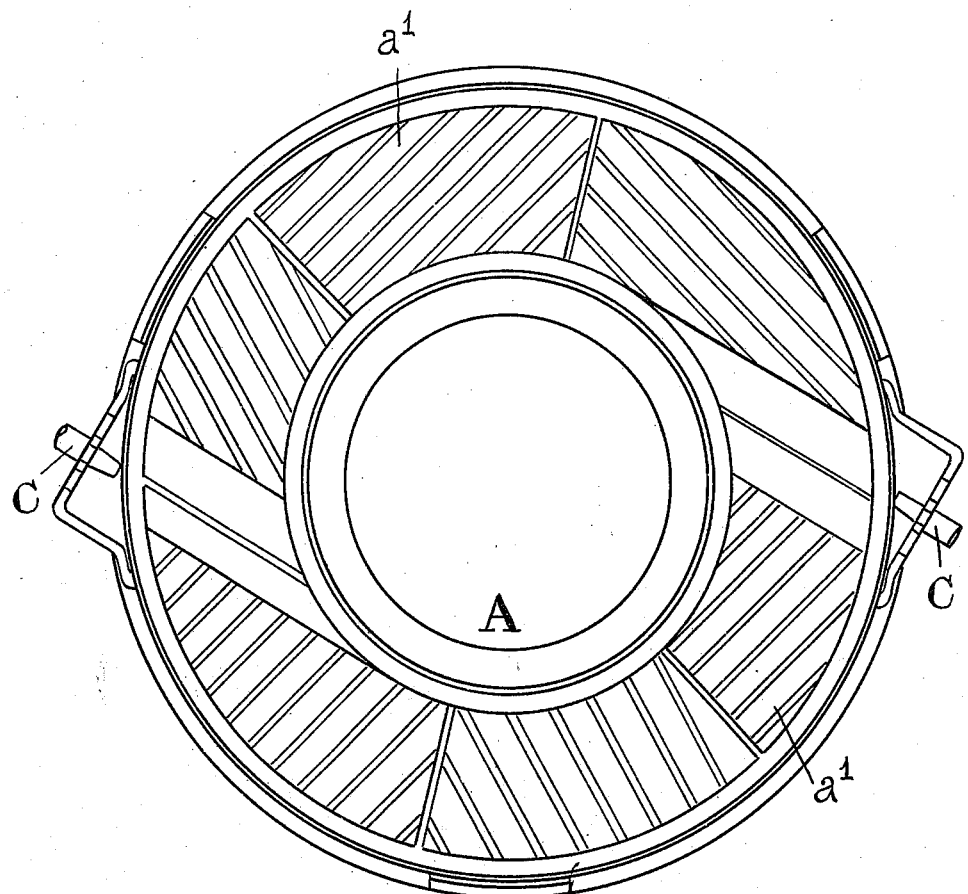
Figure 12:
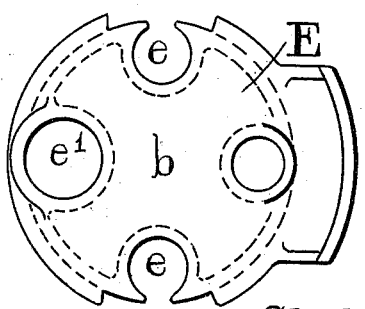
Figure 13:
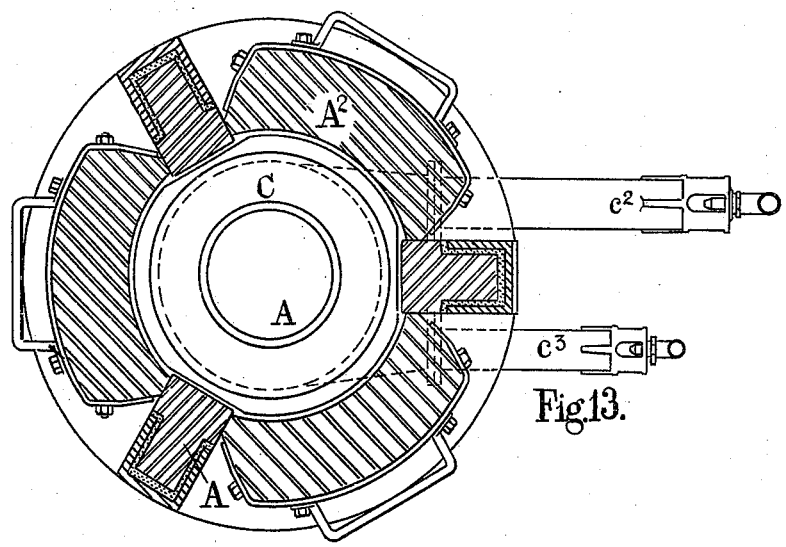

Figure 1, is a sectional elevation of the furnace pot and burner. Fig. 2, is a front elevation of the upper part of the furnace showing the exterior with the door removed. Fig. 3, is a plan view of the top. Fig. 4, is a sectional elevation of the upper part of the furnace and pot—(in a plane at right angles to Fig. 1.) Fig. 5, is a plan view with the top of furnace and lid of pot removed. Fig. 6, is a front elevation of melt pot B removed from the furnace. Fig. 7, is a side elevation of same, partly in section. Fig. 8, is a plan view of top of the same. Fig. 9, is a plan of bottom of the same. Figs. 10 and 11, are sectional elevations of the lid or cover E. Fig. 12, is a plan of lid or cover E. Fig. 13, is a sectional plan view on line $x$—$x$ Fig. 1, showing gas burner and gas supply pipes. Fig. 14, is a sectional plan showing application of oil burners.

The furnace A includes an outer casing of metal $a$, lined with fire brick $a'$, in the ordinary way, to receive the melt pot B in the interior, and a gas or oil burner C at the base. It stands or rests upon a cast iron base D and fire brick ring $C^2$ with a central aperture $d$ through which the flame from the gas burner C passes impinging first upon the bottom of the pot B and then upon the sides thereof passing up the space $a^2$ between the sides of the pot and fire brick sides $a'$ of the furnace.

The melt pot B is constructed with an aperture $b$ at one side through which the articles to be heated are inserted. An opening $b'$ is formed in one side of the casing $a$ corresponding with the opening $b$ in the side of the pot and a flange or lip $b^2$ is formed around the opening $b$ in the pot by which a close joint is made with the fire brick lining $a'$ of the casing. The flange or lip $b^2$ thus prevents any of the flame or heated gases from the burner escaping around the openings $b$ $b'$. Around the exterior surface of the pot, ribs $b^3$ are cast or fixed which retain the pot in its central position in the furnace casing, and feet are provided at the bottom to permit of the passage of the flame to the sides. The pot B is also provided with a lid or cover E which is preferably separate therefrom as shown and rests thereon by its own weight though it may be secured thereto if desired or cast therewith. Holes $e$ are formed in the lid or cover E through which the rods $f$ of the tray F pass and the tray or dipper is retained always in the pot even when not in the melt. A hole $e'$ is also provided for the pyrometer tube, and a hole $e^2$ open to the flue to allow the escape of fumes from the pot. The draft of the flue prevents the flame entering the pot.

The furnace casing $a$ is closed by a loose or removable fire brick top G with a flue or channel $g$, for the escape of the waste gases and products of combustion to which a removable flue pipe $g'$ is fitted. A permanent elbow joint $g^2$ is fitted to one side of the furnace casing with which the flue pipe $g'$ connects so that it can be easily removed to allow of the top being removed and replaced again without disturbing the permanent flue which is attached to the elbow joint $g^2$.

In the top G of the furnace casing holes $g^3$ are formed corresponding with the holes $e$ $e'$ in the lid E of the pot B and a tube H is passed down through each of the holes $g^3$ and through these tubes the rods $f$ and pyrometer tube K pass down into the interior of the pot B thereby preventing their contact with the flame or heated gases issuing from the burner C. The tubes H are of relatively large diameter and are flanged at the end to rest upon the top of the furnace and are each covered by removable caps h. The hole in the caps h is smaller than the hole in the tubes H. If therefore the rods f or pyrometer tube K stick, as they are being raised and lowered, they will stick in the easily removable caps h. The caps h are secured in position by a locking bar L or other means which can be readily withdrawn to release them. Stop brackets L' are also placed on the top G of the casing upon which the cross bar F' of the tray rods f rests when the tray F is lowered thereby preventing the tray bumping upon the bottom of the pot.

A sliding door A' is fitted to cover the side opening b' and the casing a is extended downward nearly to the level of the burner C and is provided with removable fire brick blocks $A^2$ by which the base can be completely closed around the burner C to admit air only through the burner opening or by which a regulated additional supply of air may be admitted.

A gas or oil burner C of any ordinary construction such as a ring or jet burner may be employed with the furnace. When an oil burner is employed it may be similarly arranged to the above, but at present I prefer to employ one or more burners M of the "Wells" or like type, the flame of which is directed through openings m in the casing tangentially to the side of the furnace as shown in Fig. 14 so that the flame and hot gases are given a whirling motion around the pot. This I find a most effective and efficient arrangement.

The construction of the furnace and the burners described is such that any scale which forms on the outside of the pot, or any "melt" which leaks through the pot may be readily removed without difficulty. Anything which falls around the outside of the pot falls on to the base casting and may be readily raked away, after the loose bricks or stoppers have been removed for the purpose. If anything falls from the bottom of the pot it falls right through the opening without choking the mouth of the burner. In other words, the furnace is so arranged that even if the pot should crack and the melt run down, there would be very little harm done, as the melt which runs down the outside of the pot could be easily removed by means of the openings provided for the purpose, and any melt which ran down from the bottom would fall through a clear opening instead of falling into the burner.

What I claim as my invention and desire to protect by Letters Patent is:—

1. A furnace for heating cutter tools and the like comprising in combination, a casing provided with a central flue and a closed top and having a side opening, a pot in said flue reduced in size with respect thereto to provide a surrounding passage for the products of combustion, said pot having an opening communicating with said casing opening and having means preventing access of the products of combustion to said opening, a cover for preventing ingress of the products of combustion to said pot, a burner delivering to the bottom and about the sides of said pot, and means for conveying the products of combustion from said casing.

2. A furnace for heating cutter tools and the like comprising in combination, a base, an inclosure of blocks on said base including movable blocks for regulating air admission, a casing extending upwardly from said inclosure, a burner below said base delivering to said casing, and a pot located in said casing in the path of the products of combustion delivered by said burner.

3. A furnace for heating cutter tools and the like comprising in combination a casing provided with a central flue and closed at the top, means for conveying the products of combustion from said casing, said casing being provided with a dipper opening in its side wall, a closure for said opening, a pot in said flue reduced in size with respect thereto to provide a surrounding passage for the products of combustion, said pot having a dipper opening communicating with the opening in said casing and provided with flanges engaging said surrounding passage and overlapping the walls of the openings in said casing.

4. A furnace for heating cutter tools and the like comprising in combination, a casing provided with a closed top having openings, flanged tubes projecting through said openings, tray rods projecting downwardly through said tubes and reduced in size with respect thereto, covers for said tubes provided with openings closely embracing said rods, and a bar for retaining said covers and tubes in position.

5. A furnace for heating cutter tools and the like comprising in combination, a casing provided with a top having openings therein, a pot in said casing having a top provided with openings therein registering with the openings in said top, tubes projecting through said openings in the casing top to the openings in the top of said pot, and rods projecting through said tubes into said pot, substantially as and for the purpose set forth.

6. A furnace for heating cutter tools and the like comprising in combination, a casing provided with a top having openings therein, a pot in said casing having a top provided with openings registering with the openings in said casing top, a tray in said pot, rods connected with said tray and projecting through said openings, tubes in said casing top openings, projecting through the openings in said top of said pot and surrounding parts of said rods, and means connected with said rods for lifting said tray.

7. A furnace for heating cutter tools and the like comprising in combination, a casing having a flue therein and provided with a lateral dipper opening, a closure for said dipper opening, a pot in said flue provided with a dipper opening registering with the dipper opening of said casing, means preventing access of the products of combustion to said openings, a tray in said pot, and means connected with said tray and extending external of said casing for lifting said tray.

In testimony whereof I have hereunto set my hand in presence of two subscribing witnesses.

SHIPLEY NEAVE BRAYSHAW.

Witnesses:
    I. OWDEN O'BRIEN,
    GEO. H. O'BRIEN.